United States Patent [19]

Thatcher

[11] Patent Number: 4,671,148

[45] Date of Patent: Jun. 9, 1987

[54] TRIMMER FOR CYLINDRICAL OBJECTS

[76] Inventor: Alan J. Thatcher, 9386 La Gloria Dr., Alta Loma, Calif. 91701

[21] Appl. No.: 776,389

[22] Filed: Sep. 16, 1985

[51] Int. Cl.$^4$ .......................... B23B 5/14; B23D 21/04
[52] U.S. Cl. ............................................ 82/59; 82/61; 82/65; 82/70.2
[58] Field of Search ................... 82/59, 60, 61, 64, 65, 82/66, 67, 70.1, 70.2, 72, 79, 85, 88; 30/93, 94, 95, 102

[56] References Cited

U.S. PATENT DOCUMENTS

| | | | |
|---|---|---|---|
| 2,373,472 | 4/1945 | Haumiller | 82/72 |
| 3,025,738 | 3/1962 | Winkler et al. | 82/70.2 |
| 3,772,945 | 11/1973 | Varga | 82/73 |
| 3,848,489 | 11/1974 | Santana | 82/70.2 |
| 4,112,794 | 9/1978 | Franks et al. | 82/64 |

Primary Examiner—Nicholas P. Godici
Assistant Examiner—Jerry Kearns
Attorney, Agent, or Firm—Edgar W. Averill, Jr.

[57] ABSTRACT

A trimmer for making a circumferential cut through a hollow cylindrical object. The trimmer has a rotatable cup which holds a blade support assembly which rotates with the rotatable cup. A cam member is supported by the rotatable cup and rotates in the same direction as a rotatable cup but at a slightly different speed. In one cutting cycle, the cam member rotates one revolution different from the rotatable cup. This causes the blade to move in and out of contact with the object to be cut while the blade is rotating about the periphery of the object.

14 Claims, 7 Drawing Figures

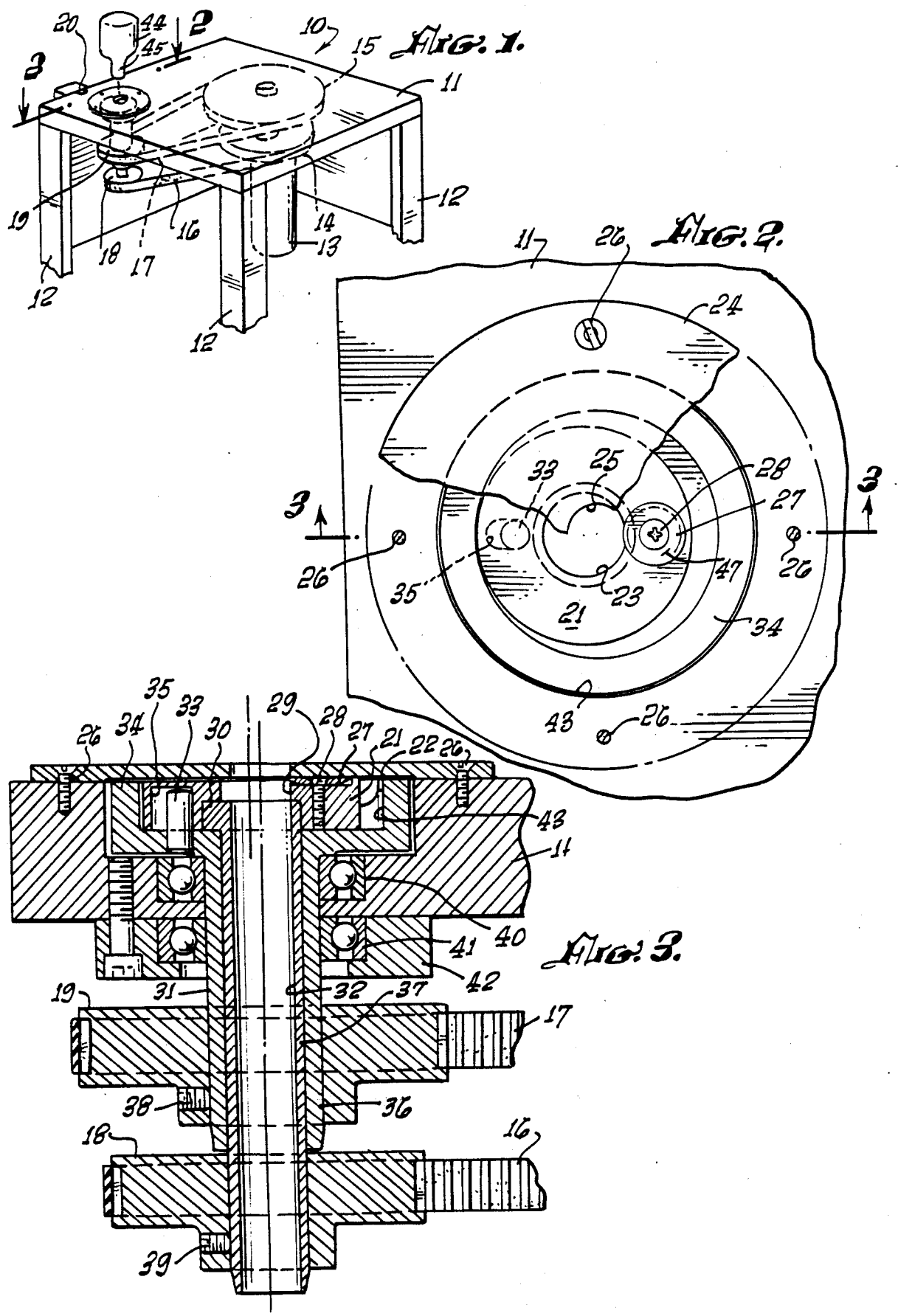

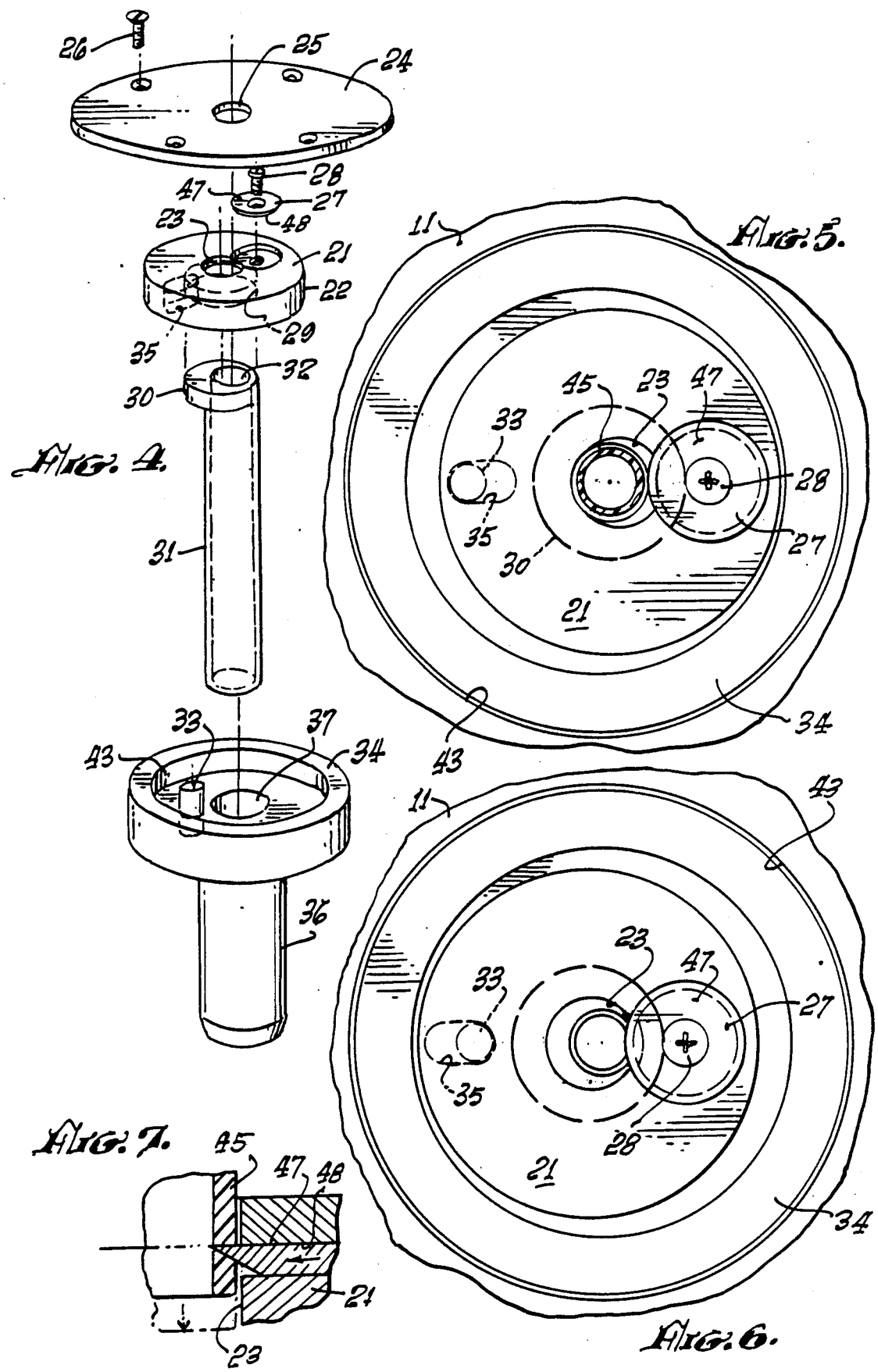

TRIMMER FOR CYLINDRICAL OBJECTS

BACKGROUND OF THE INVENTION

The field of the invention is cutting machines, and the invention relates more particularly to devices for trimming hollow objects such as the tops of plastic bottles.

In the production of plastic objects, particularly those made by the process of blow molding, it is often important to make a smooth cut at a hollow opening of the object. Because such objects are often quite thin and deformable, it is often difficult to prepare a smooth cut surface. Often the cutting blade will tend to wander and will produce a somewhat spiral cut. In those instances where the surface must seal against another surface such as a bottle top with a bottle cap, such non-concentric cut can lead to leakage and to rejects. Another common problem is debris if the cut is made by a saw-type cutter.

Numerous approaches have been taken to trim hollow objects. One approach is disclosed in applicant's U.S. Pat. No. 4,445,406 where a dome is molded into the top of a bottle, and the dome is used to support the bottle and rotate it against a knife which is angled into the path of the bottle. While such approach is satisfactory for many applications when a device is particularly thin, or when it is inconvenient for a dome to be molded in the top, such approach is unsatisfactory. An approach utilizing a spinning bottle is shown in U.S. Pat. No. 3,675,521. Another patent showing a method of cutting the top from a bottle while rotating the bottle is shown in U.S. Pat. No. 3,800,638 when the object to be cut is a thin-walled object. The pressure of the knife against the side of the unsupported neck still tends to distort it and occasionally will create a spiralled cut which results in a product which must be discarded as waste.

SUMMARY OF THE INVENTION

It is an object of the present invention to provide apparatus for making a circumferential cut through a cylindrical object.

The present invention is for a trimmer or cutter for making a circumferential cut through a cylindrical object. The trimmer has a support table which holds a rotatable cup which is provided with means for rotating the cup about its axis. A cam member is supported by the rotatable cup, and has a hollow shaft which is axially aligned with the axis of rotation of the rotatable cup. The cam portion of the cam member is supported by the base of the cup, and the cam member is circular and has its center offset from the center of its shaft. The shaft is provided for means for rotating the same in the same direction but at a different speed from that of the rotatable cup. A blade support assembly is held by the base of the rotatable cup, and it has an upper surface and a lower surface and has a cam receiving opening in the bottom thereof. The blade support assembly has a passageway through the center thereof. Blade means are held by the blade support assembly at the upper surface thereof, and the blade means extends into a passageway of the blade support assembly. An object support plate has an upper surface and a lower surface and is held by the support table so that its lower surface is adjacent the upper surface of the blade means. Means are provided for preventing the rotation of the blade support assembly with respect to the rotatable cup. In one cutting cycle, the rotatable cup rotates one rotation different that the cam member. For example, if a cutting cycle is one hundred rotations of the rotatable cup, the cam member would be rotated one hundred and one revolutions. While the term, "trimmer," is used herein, the device of the present invention is also useful for cutting pipe or other long objects into shorter lengths.

BRIEF DESCRIPTION OF THE DRAWINGS

FIG. 1 is a perspective view of the trimmer of the present invention.

FIG. 2 is an enlarged plan view, partly cut away, of the cutting portion of the trimmer of FIG. 1.

FIG. 3 is a cross-sectional view taken along line 3—3 of FIG. 2.

FIG. 4 is an exploded perspective view of the cutting apparatus of the trimmer of FIG. 1.

FIG. 5 is an enlarged plan view of the blade support apparatus and rotatable cup of the trimmer of FIG. 1 showing the blade in its retracted configuration.

FIG. 6 is an enlarged plan view of the blade support apparatus and rotatable cup of the trimmer of FIG. 1 showing the blade in its cutting configuration.

FIG. 7 is an enlarged cross-sectional view of the blade and trimmed object of the trimmer of FIG. 1.

DESCRIPTION OF THE PREFERRED EMBODIMENTS

The trimmer of the present invention is shown in perspective view in FIG. 1 and indicated by reference character 10. Trimmer 10 has a support table 11, having legs 12. Support table 11 holds a drive motor 13 which has a pair of sheaves 14 and 15 which are of a slightly different size. A pair of drive belts, of the type typically referred to as Gilmer belts, are identified by reference characters 16 and 17 and are attached, respectively, to sheaves 14 and 15 and to a second pair of sheaves 18 and 19 which are affixed to the trimmer as discussed in more detail below and shown in FIG. 3. Gilmer belts have a plurality of belt teeth which fit into matching grooves on the four sheaves and provide an accurate non-slip type of drive between the belts and the sheaves. An operating control button is indicated at 20 which, for a non-automated system, would cause the trimmer to go through one cycle when depressed. Separate servo drive motors can be used in place of a single motor with different size sheaves.

The blade holding assembly of the trimmer is shown in FIGS. 2 and 3 and is, preferably, a teflon or other polymeric material, having a low coefficient of friction and is indicated by reference character 21 in FIGS. 2 and 3. Assembly 21 is shown as a circular disk-shape member, having an outside edge 22 and an inside opening 23 which, as shown in FIG. 3, is large enough to permit the trimmed end of the bottle, or other object being trimmed, to fall through the trimmer. A bottle support plate 24 is held to table 11 by four screws 26 and has a neck support opening 25 which comprises an important feature of the present invention. Opening 25 is capable of holding a thin, cylindrical object in a secure manner so that it does not tend to be deformed by the cutting blade. As shown in FIG. 3, the cutting blade 27 which is held to blade holding assembly 21 by a screw 28, is moved into contact and through the object to be trimmed as indicated in FIG. 7 and described more fully below. Different bottle support plates would be used for different objects to be trimmed, and the opening 25 would be adjusted to accurately surround the object to be trimmed. While the term, "bottle," support plate is used, the trimmer of the present invention is, of course, not limited to trimming bottles and is capable of trimming any cylindrical object. Furthermore, the apparatus which holds the object to be cut can be a separate machine, but the "neck" should pass through an opening which is only slightly larger than the "neck" so that it will be supported against distortion. Such support would not be necessary, however, for a rigid object such as heavy wall pipe.

Plate holding assembly 21 has a circular recess 29 which is indicated in phantom lines in FIG. 2 and in cross-sectional view in FIG. 3. Circular recess 29 serves as a cam receiving opening and is only slightly larger than cam 30 which is affixed to a hollow cam shaft 31 which has a hollow central opening 32. As shown in FIG. 3, a pin 33 is held by a rotatable cup 34 and extends into a slot 35 in blade holding assembly 21. This prevents the plate holding assembly from turning in rotatable cup 34. Rotatable cup 34 has a hollow shaft 36 that has a central opening 37 which serves as a bearing to hold and support hollow cam shaft 31. Sheave 19 is held to shaft 36 by a set screw 38; similarly, sheave 18 is held to cam shaft 31 by set screw 39. It can readily be seen that as cam shaft 31 is turned with respect to hollow cup shaft 36, that cam 30 will cause the blade holding assembly to move to the right and to the left as viewed in FIG. 3, thereby bringing blade 27 into contact with any object passing through neck opening 25. Appropriate bearings 40 and 41 are held, respectively, by table 11 and bearing support cup 42.

Before describing the cutting action, brief reference will be made to FIG. 4 which shows the trimming parts of the trimmer in exploded, perspective view. The inside diameter of recess 43 is larger than the outside diameter of blade holding assembly 21 so that it may move back and forth in recess 43 as indicated in FIGS. 5 and 6. Furthermore, the central opening 23 in blade holding assembly 21 is larger than the neck support opening 25 so that it does not interfere with or contact the object being cut as the blade support assembly moves from side to side in recess 43.

In operation, neck 45 of bottle 44 is inserted through neck support opening 25, and the control button 20 is depressed to cause the machine to go through one cutting cycle. This activates drive motor 13 which is controlled to make a predetermined number of revolutions, for instance fifty revolutions, by appropriate sizing of sheaves 14 and 15 and sheaves 18 and 19. The rotatable cup 34 is caused to turn, for instance, one hundred turns and the cam member is caused to turn, for instance, ninety-nine turns. During this cycle, it can be seen that during the first approximately fifty turns, blade 27 is being slowly moved into contact with neck 45 as it is being rotated about neck support opening 25. In any one turn, blade 27 only progresses a minute amount into the neck opening and, thus, there is no significant tendency for neck 45 to be deformed. Furthermore, neck support opening 25 helps prevent any such deformation even if neck 45 is very thin. At the end of the cycle, because of the one-turn difference from the rotatable cup as compared to the cam, the cam support blade has once again returned to its retracted position as indicated in FIG. 5 and is ready for another cycle. The trimmed portion of neck 45 merely drops through central opening 32 and can be conveyed away.

Of course, for most operations, the trimmer would be augmented to operate in a continuous manner, and the bottle support plate would be shaped to hold the object to be trimmed at an accurate position and often would be a separate apparatus. Also, although a single drive motor 13 is shown, it is, of course, possible that a separate drive motor be provided for each shaft, but for any cutting cycle, the number of revolutions of the cam should be one revolution different from the number of rotations of the rotatable cup. Likewise, it is not important that the cup rotate faster than the cam, as either one may exceed the speed of the other, as long as there is a slight difference in rotational speed. Furthermore, although the blade holding assembly and internal recess of the rotatable cup are shown as circular, they could, instead, be rectangular, in which case, pin 33 and slot 35 would not be necessary as their function is merely to prevent the turning of blade holding assembly 21 with respect to rotatable cup 34.

A circular blade is advantageous since it may be sharpened by merely loosening screw 28 and turning the blade a small distance. However, other blade shapes could, of course, be used, but it is advantageous that the upper surface of blade 27 be near the lower surface of bottle support plate 24 so that neck opening 25 can serve to support the object to be trimmed. The undersurface of bottle support plate 24 is generally planar and is indicated by reference character 46. The upper surface 47 of blade 27 is also planar and almost in contact with undersurface 46.

It is believed that the trimmer of the present invention is not limited in usefulness to very thin objects and is capable of cutting relatively thick objects. It is of course, conceivable that a single cycle could involve one thousand revolutions of the cam and one thousand and one revolutions of the cup so that the speed of insertion of blade 27 into the object to be cut could be very slow.

The size of objects to be trimmed is almost unlimited. It is contemplated that the central opening 32 could be large enough to trim an object such as a garbage can top, as well as to trim a very small object as, for instance, the size of a drinking straw. Because the slowly progressing cutting movement of the knife is a very efficient means of trimming a circular object, it is anticipated that the trimmer of the present invention will be capable of trimming large and small circular objects, as well as thin or thick objects.

A trimmer was constructed utilizing a blade holding assembly fabricated from a polymer, having high lubricity sold under the trademark, "Teflon." The cam and cam shaft were made from a single brass cylinder, and the rotatable cup was fabricated from No. 7075 aluminum. Since the cam and its shaft 31 move only slowly with respect to the opening 37 in shaft 36, it is not necessary that a roller bearing be provided between these surfaces. A cutting cycle using five revolutions for rotatable cup 34 and four revolutions for cam 30 was highly successful in the trimming of a difficult-to-trim, thin-walled, cylindrical object. This provided a twin cycle of very short duration of about one-half second.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A trimmer for making a circumferential cut through a cylindrical object comprising:
   a support table;
   a rotatable cup supported by said table, said cup having a base and having means for rotating said cup about its axis, said means for rotating being connected to said cup;
   a cam member supported by said rotatable cup and having a hollow shaft, said shaft being axially aligned with the axis of said rotatable cup, said cam portion of said cam member being supported by the base of said cup and being circular and having its center offset from the center of its shaft, said shaft having means for rotating the cam member about the central axis of said shaft in the same direction but at a speed different from that of said rotatable cup;
   a blade support assembly held by the base of said rotatable cup, said blade support assembly having an upper surface and a lower surface and having a cam receiving opening in the bottom thereof and said support assembly having a passageway through said assembly;
   blade means having an upper surface, said blade means being held by said blade support assembly at the upper surface thereof, said blade means extending into the passageway of said blade support assembly; and
   means for preventing the rotation of said blade support assembly with respect to said rotatable cup, said means for preventing the rotation of said blade being interconnected between said blade support assembly and said rotatable cup.

2. The trimmer of claim 1 wherein said rotatable cup has a hollow shaft extending through said support table.

3. The trimmer of claim 2 wherein the hollow shaft of said cam member is held in the hollow shaft of said rotatable cup.

4. The trimmer of claim 1 wherein said blade support assembly has a circular exterior, said cam receiving opening is circular and the circular exterior and the cam receiving opening are concentric with respect to each other.

5. The trimmer of claim 4 wherein said means for preventing the rotation of said blade support assembly with respect to said rotary cup comprises a pin and slot combination.

6. The trimmer of claim 5 wherein the pin is located in the rotatable cup and the slot is located in the bottom of said blade holding assembly.

7. The trimmer of claim 1 wherein said blade means is circular.

8. The trimmer of claim 1 wherein the speed of rotation of the rotating cup is set so that in one cutting cycle, it will turn at one revolution different than that of the cam member.

9. A trimmer for making a circumferential cut through a cylindrical object comprising:
   a support table;
   a circular, rotatable cup supported by said table, said cup having a base and having a hollow shaft concentrically positioned at the base thereof, said cup having an opening therethrough coincident with the opening in said hollow shaft, said rotatable cup having means for rotating said cup about its vertical axis, said means for rotating being connected to said cup;
   a cam member supported by said rotatable cup and having a hollow shaft, said shaft being axially aligned and fitting with the hollow shaft of the said rotatable cup, said cam portion of said cam member being supported by the base of said cup and being circular and having its center offset from the center of its shaft, said shaft having means for rotating the cam member about the central axis of said shaft in the same direction but at a speed different from that of said rotatable cup;
   a blade support assembly held by the base of said rotatable cup, said blade support assembly having an upper surface and a lower surface and having a circular cam receiving opening in the bottom thereof, having an inside diameter slightly larger than the outside diameter of the cam and said support assembly having a passageway through said assembly which is larger than the opening in the hollow shaft of the cam member;
   blade means having an upper surface, said blade means being held by said blade support assembly at the upper surface thereof, said blade means extending into the passageway of said blade support assembly;
   an object support plate having an upper surface and a lower surface and having a circular opening therethrough, the plate being supported by said support table so that its lower surface is adjacent the upper surface of said blade means; and
   means for preventing the rotation of said blade support assembly with respect to said rotatable cup, said means for preventing the rotation of said blade being interconnected between said blade support assembly and said rotatable cup.

10. The trimmer of claim 9 wherein the top of said blade support assembly is flat and the blade has its upper surface in the same plane as the top of the blade support assembly.

11. The trimmer of claim 10 wherein the lower surface of the object support plate is in close proximity to the top of the blade support assembly.

12. The trimmer of claim 11 wherein said blade of said blade means is a circular blade having a flat upper surface and is bevelled inwardly from its outer periphery.

13. The trimmer of claim 9 wherein the shaft of said cam member extends below the terminus of the shaft of the rotatable cup.

14. The trimmer of claim 13 wherein the shaft of said cam member has a sheave thereon and the shaft of said rotatable cup has a sheave thereon.

* * * * *